(12) United States Patent
Wittebrood et al.

(10) Patent No.: US 8,455,110 B2
(45) Date of Patent: Jun. 4, 2013

(54) ALUMINIUM BRAZING SHEET MATERIAL

(75) Inventors: Adrianus Jacobus Wittebrood, Velserbroek (NL); Theobald De Haan, Uden (NL); Achim Bürger, Höhr-Grenzhausen (DE)

(73) Assignee: Aleris Aluminum Koblenz GmbH, Koblenz (DE)

( * ) Notice: Subject to any disclaimer, the term of this patent is extended or adjusted under 35 U.S.C. 154(b) by 252 days.

(21) Appl. No.: 13/000,481

(22) PCT Filed: Jun. 25, 2009

(86) PCT No.: PCT/EP2009/057956
§ 371 (c)(1),
(2), (4) Date: Jan. 7, 2011

(87) PCT Pub. No.: WO2010/000666
PCT Pub. Date: Jan. 7, 2010

(65) Prior Publication Data
US 2011/0111254 A1    May 12, 2011

Related U.S. Application Data

(60) Provisional application No. 61/077,615, filed on Jul. 2, 2008.

(30) Foreign Application Priority Data

Jul. 3, 2008  (EP) .................................. 08012003

(51) Int. Cl.
*B32B 15/20* (2006.01)
*B23K 35/28* (2006.01)
*C22C 21/02* (2006.01)

(52) U.S. Cl.
USPC ..................... 428/654; 228/262.51

(58) Field of Classification Search
None
See application file for complete search history.

(56) References Cited

U.S. PATENT DOCUMENTS

| 3,168,381 | A | * | 2/1965 | Finnegan et al. ............. 428/654 |
| 3,917,151 | A | | 11/1975 | Robinson |
| 4,161,553 | A | | 7/1979 | Vernam et al. |
| 4,241,148 | A | | 12/1980 | Schoer et al. |
| 4,489,140 | A | | 12/1984 | Pulliam et al. |
| 5,069,980 | A | | 12/1991 | Namba et al. |
| 5,728,479 | A | | 3/1998 | Childree et al. |
| 6,896,977 | B2 | | 5/2005 | Nishimura |
| 7,374,827 | B2 | * | 5/2008 | Kilmer .......................... 428/654 |
| 7,472,740 | B2 | | 1/2009 | Anderson |
| 7,819,170 | B2 | | 10/2010 | Anderson |
| 8,158,273 | B2 | * | 4/2012 | Wittebrood ................... 428/654 |
| 2002/0142185 | A1 | * | 10/2002 | Kilmer .......................... 428/654 |
| 2003/0099856 | A1 | | 5/2003 | Takeno et al. |
| 2006/0185816 | A1 | | 8/2006 | Anderson |

FOREIGN PATENT DOCUMENTS

| EP | 1 306 207 A1 | 5/2003 |
| EP | 1 430 988 A1 | 6/2004 |
| GB | 2 240 741 | 8/1991 |
| JP | 03-133569 | * 6/1991 |
| WO | 95/21741 A1 | 8/1995 |
| WO | 2004/112992 A2 | 12/2004 |
| WO | 2008/155067 A1 | 12/2008 |

OTHER PUBLICATIONS

Provisional U.S. Appl. No. 60/946,417, filed Jun. 27, 2007. No publication date.*
W. Hufnagel, Key to Aluminium Alloys, 4$^{th}$ Edition, Aluminium Verlag GmbH, Düsseldorf, Germany, pp. 195-205 (1991).
Opposition to EP Patent No. 2323805, Nov. 8, 2012.
"Aluminiumtaschenbuch Band 3, Weiterverarbeitung und Anwendung", 16 Edition, 2003, pp. 250-257.

* cited by examiner

*Primary Examiner* — John J Zimmerman
(74) *Attorney, Agent, or Firm* — Novak Druce Connolly Bove + Quigg, LLP

(57) ABSTRACT

A brazing sheet material for CAB brazing without applying flux. The brazing sheet material including an aluminum core alloy layer provided with a first brazing clad layer material on one or both sides of the aluminum core layer and at least one second brazing clad layer material positioned between the aluminum core alloy layer and the first braze clad layer material. The second brazing clad layer material is an Al—Si alloy brazing material having 5% to 20% Si and 0.01% to 3% Mg, and the first brazing clad layer material is an Al—Si alloy brazing material having 2% to 14% Si and less than 0.4% Mg. Also disclosed is a brazed assembly manufactured in a brazing operation.

25 Claims, No Drawings

ALUMINIUM BRAZING SHEET MATERIAL

CROSS-REFERENCE TO RELATED APPLICATIONS

This application is a §371 National Stage Application of International Application No. PCT/EP2009/057956, filed on 25 Jun. 2009, claiming the priority of US Provisional Application No. 61/077,615 on 2 Jul. 2008 and European Patent Application No. 08 012 003.3 filed on 3 Jul. 2008.

FIELD OF THE INVENTION

The invention relates to a brazing sheet material comprising of an aluminium core alloy layer provided with a first Al—Si alloy brazing clad layer material on one or both sides of said aluminium core layer and at least one second Al—Si alloy brazing clad layer material positioned between the aluminium core alloy layer and the first brazing clad layer material.

The invention further relates to a brazed assembly manufactured in a brazing operation, the brazed assembly comprising various components and at least one component being made from the aluminium alloy brazing sheet according to this invention.

BACKGROUND TO THE INVENTION

As will be appreciated herein below, except as otherwise indicated, aluminium alloy designations and temper designations refer to the Aluminum Association designations in Aluminum Standards and Data and the Registration Records, as published by the Aluminum Association in 2008.

For any description of alloy compositions or preferred alloy compositions, all references to percentages are by weight percent unless otherwise indicated.

Substrates of aluminium or aluminium alloy in the form of sheet or extrusion, are used to make shaped, or formed, products. In some of these processes parts of (shaped) aluminium comprising substrates are interconnected. One end of a substrate may be interconnected with the other end, or one substrate may be assembled with one or more other substrates. This is commonly done by brazing. In a brazing process, a brazing filler metal or brazing alloy, or a composition producing a brazing alloy upon heating, is applied to at least one portion of the substrate to be brazed. After the substrate parts are assembled, they are heated until the brazing metal or brazing alloy melts. The melting point of the brazing material is lower than the melting point of the aluminium substrate or aluminium core sheet.

Brazing sheet products find wide applications in heat exchangers and other similar equipment. Conventional brazing products have a core of rolled sheet, typically, but not exclusively an aluminium alloy of the 3xxx-series, having on at least one surface of the core sheet an aluminium clad layer (also known as an aluminium cladding layer). The aluminium clad layer is made of an 4xxx-series alloy comprising silicon in an amount in the range of 2 to 20% by weight, and preferably in the range of about 7 to 14% by weight. The aluminium clad layer may be coupled or bonded to the core alloy in various ways known in the art, for example by means of roll bonding, cladding spray-forming or semi-continuous or continuous casting processes. These aluminium clad layers have a liquidus temperature typically in the range of about 540 to 615° C.

There are various brazing processes in use for the industrial scale manufacturing of brazed assemblies such as heat exchangers.

There is vacuum brazing ("VB") which is carried out at relatively low atmosphere pressure in the order of about $1.10^{-5}$ mbar or less. To obtain the optimum conditions for joining to take place, Al—Si brazing alloys commonly used for vacuum brazing contain purposive additions of Mg of 1% or more. The believed mechanism is that Mg destroys the hard oxide film of the filler alloy when it evaporates from the brazing sheet during brazing, and further the evaporated Mg plays the role as getter that removes oxygen and moisture remaining in the brazing furnace.

Such a Mg-containing brazing sheet product for vacuum brazing is disclosed in U.S. Pat. No. 4,489,140 wherein the brazing sheet product for vacuum comprising of a AA3000-series core alloy, clad with a AA4104 brazing alloy layer and having an AA4343 brazing alloy interposed between the core alloy and the AA4104 brazing alloy layer to provide consistently good bonding between the core and the AA4104 alloy. It is well known in the art that AA4104 alloys contain Mg in a range of 1.2 to 2.0% and Bi in a range of 0.02 to 0.2%, and that the AA4343 alloys have neither Bi nor Mg.

U.S. Pat. No. 5,069,980 discloses a vacuum-brazing aluminium cladding material consisting of a core member of aluminium alloy, and a first clad and a second clad, said first clad consisting essentially of 6 to 14% of Si, 0 to 0.6% Mg, and the balance being Al, and said second clad consisting of 0 to 14% Si, and preferably zero % Si, and 0.8 to 2.5% Mg and the balance being Al, and wherein the thickness of the second clad is a function of the Si-content in this second clad layer.

U.S. Pat. No. 4,161,553 discloses a brazing sheet product for vacuum brazing, the brazing sheet comprising an aluminium alloy core alloy, a first layer of an aluminium brazing alloy consisting essentially of 0 to 2.5% Mg, 5.0 to 13.0% Si, max. 0.8% Fe, max. 0.3% Cu, max. 0.3% Zn, max. 0.3% Mn, balance aluminium, and a second layer of an aluminium alloy clad on the first layer, said second layer consisting essentially of 0.5 to 1.2% Mg, 1.2 to 1.8% Si, max. 0.3% Cu, max. 0.7% Fe, max. 1.5% Mn, balance aluminium, the second layer having a melting point substantially equivalent to the melting point of the first layer. In an example each of the first and second layer the aluminium alloys had a Mg content of 0.5%.

Another brazing process is controlled atmosphere brazing ("CAB") which is carried out in a dry no oxygen containing atmosphere, preferably using the inert environment of nitrogen, but for example also argon can be used. To facilitate brazing a non-corrosive brazing flux, e.g. a fluoride based flux, is applied prior to brazing on the pieces to be joined. This brazing flux removes or at least brakes open during the brazing operation the always present oxide layer to allow the molten filler to come into contact with bare metal to form the joint. The aluminium alloys used for CAB should be free of Mg because any Mg is inhibiting the brazing flux action in removing the oxide layer. In complex shaped assemblies the application of the non-corrosive brazing flux prior to brazing at the interior of the assemblies is often considered very difficult and problematic.

Yet another brazing process is CAB without using a brazing flux, and this process is in particular being used for joining by means of brazing of surfaces inside a heat exchanger with are very difficult to flux and on an industrial scale is more cost effective than a vacuum brazing operation as vacuum brazing requires considerable capital equipment costs.

In European patent document EP-1430988-A1 it is disclosed that for such a process of CAB without using a brazing flux that the brazing sheet product used contains Mg at least in a layer constituting the brazing sheet other than the filler alloy layer, typically the core alloy contains Mg in a range of 0.05 to 1.0 wt.%. Interposed between the core alloy and the filler alloy an diffusion prevention layer is present, such an a Mg-free AA3003-series aluminium alloy.

European patent document EP-1306207-B1 discloses another fluxless brazing process in an inert gas atmosphere containing a very low oxygen content of up to 1000 ppm, and preferably up to 500 ppm. Furthermore there is disclosed a brazing sheet product comprising of an aluminium core alloy on one or both sides clad with an Al—Si alloy brazing alloy containing 0.1 to 5% of Mg and 0.01 to 0.5% of Bi as an intermediate layer, and a thin covering material clad onto the Al—Si alloy brazing alloy. It is disclosed that during a brazing operation the brazing material in the intermediate layer is molten as the temperature is elevated during brazing, but oxidation of the surface of the brazing material does not occur because the surface is covered with the thin covering material which remains solid. When the temperature is further elevated, the portions with lower melting points, such as a segregation portion of the thin covering material close to the molten brazing material, are locally molten, and then the brazing material seeps and spreads over the surface of the thin covering material due to volumetric expansion. The surface of the brazing material then becomes an emerging face without an oxidation film, and new intensive oxidation does not proceed due to the inert gas atmosphere.

There is a need for further improved brazing sheet materials and brazing processes in which the interior side of an assembly does not have to be provided with a brazing flux.

DECSRIPTION OF THE INVENTION

It is an object of the invention to provide an alternative aluminium alloy brazing sheet material that can be applied in a controlled atmosphere fluxless brazing process without applying a brazing flux.

It is another object of the invention to provide an aluminium alloy brazing sheet material that can be applied in a controlled atmosphere fluxless brazing process without applying a brazing flux as well as in a controlled atmosphere brazing process with a brazing flux.

It is another object of the invention to provide an aluminium alloy brazing sheet material that can be applied in a controlled atmosphere fluxless brazing process as well as in a controlled atmosphere brazing process with a brazing flux, as well as in a vacuum brazing process.

These and other objects and further advantages are met or exceeded by the present invention providing a brazing sheet material comprising of an aluminium core alloy layer having a first brazing clad layer material on one or both sides of said aluminium core layer and at least one second brazing clad layer material positioned between the aluminium core alloy layer and the first braze clad layer material, wherein the second brazing clad layer material is an Al—Si alloy clad brazing material having 5% to 20% Si and 0.01% to 3% Mg, and wherein the first brazing clad layer material is an Al—Si alloy brazing material having 2% to 14% Si and less than 0.4% Mg.

In accordance with the invention it has been found that by maintaining a very low Mg level in the first Al—Si alloy brazing clad layer material and having a controlled purposive addition of Mg to the second Al—Si alloy brazing clad layer material, a brazing sheet product is provided that can be applied successfully in a controlled atmosphere brazing process without the use of a brazing flux.

In European patent document EP-1306207-B1 it is reported that in order to achieve successful CAB brazing without the use of a brazing flux it is required that both the top layer and the aluminium core material layer should have a solidus temperature higher than the liquidus temperature of the intermediate brazing material layer. In this way the molten brazing material during a subsequent brazing operation at a temperature between the liquidus temperature and the solidus temperature is to cause the Al—Si alloy brazing material layer to melt down while keeping the thin covering material layer solid to prevent oxidation of the brazing material being melted, and then cause the Al—Si alloy brazing material to, due to volumetric expansion, seep through segregation portions of the thin covering material layer onto a surface of the thin covering material layer and spread over the surface of the thin covering material to form an emerging surface resulting in a brazed joint. Whereas in the brazing sheet material according to the present invention the first and second Al—Si alloy brazing clad layers may have substantially equivalent solidus and liquidus temperatures, while still being able to be used successfully in a controlled atmosphere brazing operation.

Furthermore, it has been found in accordance with this invention that the brazing sheet product can be applied successfully in a vacuum brazing operation despite the low level of Mg in the filler metal formed by the first and second Al—Si alloy brazing clad materials, more in particular where the first Al—Si alloy clad material layer, being the outer clad layer, has a very low Mg-content. This is contrary to industry practice for vacuum brazing where the clad layer or outer lad layer material has a typical Mg content of more than 1%.

In addition it has been found that the brazing sheet material according to this invention is a very attractive candidate for application in brazed assemblies having one or more inner surfaces which are difficult to flux. Surprisingly, it has been found, despite the use of Mg additions which are normally not desirable for the flux brazing processes such as NOCOLOK (registered trademark of Alcan), that the brazing sheet product according to this invention can be brazed in a controlled atmosphere brazing process while applying a brazing flux. This makes the brazing sheet product a very attractive candidate for the production of for example brazed oil coolers. Oil coolers are commonly built up from plates which have to braze internally and externally. Due to the long brazing cycle it is necessary to flux the outside of the oil cooler to facilitate brazing. Long brazing cycles would give otherwise excessive oxidation even in a controlled atmosphere environment, thereby reducing the capability to form reliable joints. The applied brazing flux reduces significantly the degree of oxidation. Also, with the brazing sheet product according to this invention good brazed joint are obtained at inner surfaces without the requirement of applying a brazing flux.

In the brazing sheet material according to the invention the core alloy layer is made for an aluminium alloy. The core alloys are preferably from the 2xxx-, 3xxx-, 5xxx-, or 6xxx-series aluminium alloys, for example an AA3003, AA3005, AA6060 or AA6063-type alloy.

When used in a CAB operation incorporating also the use of a brazing flux it is preferred that the Mg-content in the core alloy layer is being controlled such that it is not more than about 0.3%, and more preferably not more than about 0.2%, and more preferably not more than about 0.10%.

In an embodiment the core alloy layer is an AA3000-series alloy having not more than about 0.3% Mg, in particular when used to manufacture an article joined by means of CAB with applying a brazing flux. More preferably the core alloy layer is an aluminium alloy comprising, in wt. %:

| | |
|---|---|
| Mn | 0.5 to 2.0 |
| Cu | 0 to 1.2 |
| Fe | 0 to 1.0 |
| Si | 0 to 1.0 |
| Bi | 0 to 0.1 |
| Ti | 0 to 0.1 |
| Mg | 0 to 0.3, preferably 0 to 0.2, | other elements and inevitable impurities, each <0.05, total <0.2, balance aluminium.

According to this invention the first Al—Si alloy brazing clad layer comprises at least Si in a range of 2.0 to 14% and has Mg, if present, of less than 0.4%.

In accordance with the invention it has been found that the Mg content in the first Al—Si alloy brazing clad layer should be kept low, and should more preferably be less than about 0.15%. On a more preferred basis it is an Al—Si brazing alloy being Mg-free to avoid the formation of an oxide layer during a brazing operation. In practical terms this would mean that Mg is present at a very low level of an impurity or incidental element, typically <0.08%, and ideally at a level of <0.05%, and more preferably <0.01%. More preferably the aluminium alloy is substantially free of Mg. With "substantially free" is meant that no purposeful addition of Mg was made to the chemical composition but that due to impurities and/or leaking from contact with manufacturing equipment, trace quantities of Mg may nevertheless find their way into the aluminium alloy product.

In an embodiment of the first Al—Si alloy brazing clad layer the Si content is preferably in a range of 2.0 to 5%, and preferably in a range of 2.0 to 4.0%. In this embodiment there is a significant difference in Si-content between the first and the second Al—Si alloy brazing clad layer, which is of assistance in the quality control of the clad liner thickness. A lower Si content in the outer clad layer of the brazing sheet material results in a lower die wear when shaping the brazing sheet material, for example by means of bending or folding.

In another embodiment of the first Al—Si alloy brazing clad layer the Si content is preferably in a range of about 4% to 14%, and more preferably in the range of about 6% to 12%. In an embodiment the first brazing clad material layer has a chemical composition within the range of an AA4045 or an AA4343-series aluminium alloy, preferably with the further proviso that the alloy has a very low Mg content as set out in this description, and ideally is Mg-free.

The second Al—Si alloy brazing clad material comprises Si in a range of 5% to 20% and Mg in a range of 0.01% to about 3%. In a preferred embodiment the lower-limit for the Si content is about 6%, and a preferred upper-limit for the Si content is about 14%. In a preferred embodiment the Mg content has an upper-limit of about 1.5%.

In the embodiment where the brazing sheet material according to this is applied in a CAB operation without the use of a brazing flux, the Mg content in the second Al—Si alloy brazing material is controlled in a range of 0.01% to about 1%, and more preferably the upper limit is about 0.50%, and more preferably about 0.20%.

When used in a CAB operation, with or without the use of a brazing flux, it is preferred that the sum of the Mg content in the first and second Al—Si alloy brazing clad layers is controlled such that it does not exceed about 0.25%, and preferably does not exceed 0.10%. At present the quality and control mechanisms when producing aluminium brazing sheet products allow for the target and the control of Mg within an accuracy of ±0.01% or better.

Ideally, the Si content in the first and second Al—Si alloy brazing material layer is selected such that the sum of the Si contents of both layers is in a range of 6% to 12.5%, and preferably in the range of 6% to 11%. In a more preferred embodiment the sum of the Si content is in a range of 9% to 11%. And in another preferred embodiment the sum of the Si content is in the range of 6.5% to 8.5%.

The amount of Fe present in the Al—Si alloy brazing material, both for the first and second Al—Si alloy brazing clad material, depends primarily on the origin of the alloy material and can be up to about 0.8%, and preferably is not more than about 0.6%. As grain refiner element Ti can be present in the brazing material in a range of up to about 0.2%, preferably up to 0.15%. The balance is made by unavoidable impurities and aluminium. Also Cu can be present as a tolerable impurity element, typically to a level of up to 0.3%, but preferably does not exceed 0.1%.

In an embodiment Mn can be present in the first and/or in the second Al—Si alloy brazing material layer in the range of about 0.2% to 0.8% to improve on the corrosion resistance of the aluminium brazing sheet material. At a level below about 0.2% the effect of improved corrosion resistance by the Mn addition is not found. Preferably the amount of Mn is at least about 0.3% to provide improved corrosion resistance. With a view to the properties of the alloy, the amount of Mn should be not more than 1.0%, and a preferred maximum is 0.8%, since above this level the improved corrosion resistance may be less. In the embodiment where Mn is purposively added it is preferred that the Mn/Fe ratio in weight percent is at least 1, and more preferably at least 2.

In the embodiment where Mn is purposively added to one or both of the Al—Si alloy brazing materials layers, it is preferred to have a difference in Mn levels between the two adjacent brazing clad materials of at least about 0.1%, and preferably of at least about 0.2%. A difference in Mn levels is of assistance as a quality control means for the clad liner thickness, e.g. by means of etching techniques. During a brazing operation the two Al—Si alloy brazing materials form one filler metal to form a joint and levelling out any compositional difference present prior to brazing.

In an embodiment each of the first or second Al—Si alloy brazing clad material layers further contains one or more wetting elements. Preferably the wetting elements are selected from the group comprising Bi, Pb, Li, Sb, Se, Y, and Th, and wherein the total amount of the wetting elements is in a range of about 0.01% to 0.5%. In a preferred embodiment the element Bi is selected from the group of wetting elements and is in a range of about 0.01% to 0.5%, and preferably in a range of about 0.01% to 0.25%, as being the most efficient wetting element for this purpose in this alloy system during a brazing operation.

Preferably the wetting agent is added to the second Al—Si alloy brazing material layer. In the embodiment that Bi is added to the brazing material layer it is further preferred that excess Mg content with respect to stoichiometric composition of $Bi_2Mg_3$ is 0.07% or less, and preferably 0.05% or less. It has been found that Bi has a low solubility in aluminium and tends to separate out at the grain boundaries even when added at low levels of for example about 0.1%. To overcome this a small amount of Mg will form $Bi_2Mg_3$ which stops separation at the grain boundaries. This $Bi_2Mg_3$ phase will however dissolve in the Al—Si clad layer material at melting of the brazing material releasing the Bi to lower the surface tension of the molten filler.

In an embodiment each of the Al—Si alloy brazing clad material layers may further contains one or more elements selected from the group consisting of about 0.1% to 8% of Zn, about 0.01% to 1% of In, about 0.01% to 1% of Sn, and about 0.01% to 1% of Ge. These alloying elements improve the corrosion resistance of the core material by making the Al—Si brazing material more sacrificial with respect to the core material. When the amount is less than the lower limit the sacrificial anode effect is not sufficient to produce the sacrificial anode effect, and when more than the upper limit is present it does not provide any further improvement on the corrosion resistance, whereas the alloy is more difficult to manufacture.

There are several possible configurations for the brazing sheet material according to the invention.

In an embodiment the core alloy layer is provided on one side with the first Al—Si alloy brazing clad material layer and with the second Al—Si alloy brazing clad material positioned between the core alloy layer and said Al—Si alloy brazing clad material, and whereby the other side of the core layer is bare such that the brazing sheet material comprises of a three layer configuration.

In an alternative embodiment of the brazing sheet material according to this invention the core alloy layer is provided on both sides with the first Al—Si alloy brazing clad material layer and with the second Al—Si alloy brazing clad material positioned between the core alloy layer and the first Al—Si alloy brazing clad material. When both sides of the core layer are clad in the same manner, the brazing sheet material comprises of at least a five layer configuration.

In another embodiment, when one side of the core alloy layer is clad with the two Al—Si alloys brazing clad material layers according to this invention, on the other side of the core alloy layer an outerlayer can be applied. The outerlayer or outerliner would generally be of an alloy tailored to provide high corrosion resistance or even corrosion combined with erosion resistance in the environment to which that face of the brazing sheet material is exposed, for example when used as a waterside liner in a heat exchanger. An example of a suitable outerliner would be an aluminium alloy having a purposive addition of Zn (up to about 6%), such as for example an AA7072-series alloy.

In yet another embodiment a further aluminium alloy layer can be interposed between the core alloy layer and the second Al—Si alloy brazing clad material. For example a further aluminium alloy layer may be applied for example to limit diffusion of alloying elements from the core layer to the brazing layer or to further improve on the corrosion performance of the brazing sheet product.

The brazing sheet material according to this invention can be manufactured via various techniques. For example by roll bonding as is well known in the art. Alternatively one or more of the Al—Si brazing alloy layers can be applied on the core alloy layer by means of thermal spraying techniques. Or alternatively the core alloy layer and the second Al—Si alloy braze clad material can be manufactured by means of casting techniques, for example as disclosed in international patent document WO -2004/112992, where after the first Al—Si alloy braze clad material can be applied by means of for example roll bonding or thermal spraying techniques.

The brazing sheet material according to the invention has a typical thickness at final gauge in the range of about 0.05 to 4 mm. The brazing sheet material is preferably up to about 350 microns thick at final gauge, and more preferably about 100 to about 250 microns thick.

The first Al—Si alloy braze clad material layer has preferably a thickness which is about 3 to 15% of the entire thickness of aluminium alloy brazing sheet material. The second Al—Si alloy braze clad material layer has a thickness of about 3 to 20%, and preferably about 3 to 15%, of the entire thickness of the aluminium alloy brazing sheet material. The first and second Al—Si alloy braze clad material layers may have about equal thicknesses.

Preferably the sum of the thickness of the first and second Al—Si alloy braze clad material layers applied on a side of the core alloy layer are in a range of 5 to 20% of the entire thickness of the aluminium alloy brazing sheet material.

In a further aspect of the invention there is provided an article comprising at least two formed members joint by brazing, for example a heat-exchanger, incorporating at least the aluminium alloy brazing material according to this invention as one of the formed members. A typical example of a heat-exchanger benefiting for the aluminium alloy brazing material according to this invention is an oil cooler, and whereby ideally at least the first and second Al—Si alloy braze clad materials joints a hollow formed in the article. Another typical example is a B-tube, its configurations being well known to the skilled person, in which there is an inner surface which cannot be fluxed whereas on the outer surface fins should be joined to the tube.

In another aspect of the invention there is provided a method of manufacturing an article joined by brazing or an assembly of brazed components, comprising the steps of:
 (i) forming the components of which at least one is made from an aluminium alloy brazing material according to this invention as set out above and the claims;
 (ii) assembling the components into an assembly;
 (iii) brazing the assembly without applying flux in an inert gas atmosphere at a brazing temperature for a period long enough for melting and spreading of the filler material; Typically the oxygen content in the brazing atmosphere should be as low as reasonable possible, and is preferably below 1000 ppm, and more preferably below 200 ppm;
 (iv) cooling the brazed assembly, typically to below 100° C.

Ideally, when assembling the components into an assembly suitable for joining by brazing, one side of the brazing sheet material of the invention having the first and second Al—Si alloy brazing clad material layers is being kept inside the assembly forming the brazing sheet material to constitute a hollow structure. While using the brazing sheet material according to this invention there is no need to apply a flux in order to obtain a good joint with the brazing operation.

In another aspect of the invention there is provided a method of manufacturing an article joined by brazing or an assembly of brazed components, comprising the steps of:
 (a) forming the components of which at least one is made from an aluminium alloy brazing material according to this invention;
 (b) assembling the components into an assembly, and wherein one side of the brazing sheet material having the first and second Al—Si alloy brazing material layer is being kept inside the assembly formed by the brazing sheet material to constitute a hollow structure;
 (c) brazing the assembly without applying flux in the hollow structure and applying a flux on at least part of the outside of the assembly of components and brazing the whole assembly in an inert gas atmosphere at a brazing temperature for a period long enough for melting and spreading of the filler material; Typically the oxygen content in the brazing atmosphere should be as low as reasonable possible, and is preferably below 1000 ppm, and more preferably below 200 ppm;
 (d) cooling the brazed assembly, typically to below 100° C.

In another aspect of the invention there is provided a method of manufacturing an article joined by brazing or an assembly of brazed components, comprising the steps of:
(a) forming the components of which at least one is made from an aluminium alloy brazing material according to this invention;
(b) assembling the components into an assembly;
(c) brazing the assembly without applying flux in a vacuum atmosphere at a brazing temperature for a period long enough for melting and spreading of the filler material;
(d) cooling the brazed assembly, typically to below 100° C.

It has been found that the brazing sheet material according to this invention can be brazed successfully in a vacuum brazing operation. A good fillet formation is being obtained at significantly lower Mg contents in the Al—Si brazing material commonly used in vacuum brazing operations. Furthermore it has been found that already a good fillet formation can be obtained at less deep vacuum pressures than commonly applied in industrial scale vacuum furnaces.

In the following, the invention will be explained by the following non-limitative examples.

EXAMPLES

Example 1

In a series of experiments 1 mm brazing sheet material has been manufactured. Core sheet of 45 mm has been produced from small ingots which have been pre-heated at 430° C. and then hot rolled to 45 mm. Al—Si alloy clad materials to form the first and the second clad layer has been produced from small ingots which have been pre-heated to 430° C. and hot rolled to 5 mm and then cold rolled to 4 mm.

A five-layer brazing sheet product has been manufactured consisted of a core alloy having a composition of 0.25% Fe, 0.1% Si, 0.2% Mg, 0.5% Cu, 1.0% Mn, balance aluminium and impurities, on both sides clad with a first Al—Si alloy brazing clad, and on both sides of the core layer a second Al—Si alloy brazing material has been positioned between the core alloy layer and the first brazing clad layer. The composition of the first Al—Si clad material layer was an AA4343-series alloy having 7.5% Si and being devoid of Mg. The composition of the second Al—Si clad layer material was 12.7% Si, 0.3% Fe, 0.09% Bi, 0.08% Mg, balance aluminium and impurities.

This five-layer brazing sheet material has been manufactured by placing on a 45 mm core sheet the various 4 mm clad layers. The 61 mm thick product was then for 3 hours pre-heated at 430° C., then hot rolled to 3 mm and then cold rolled to 1 mm. The 1 mm brazing sheet material was annealed for 2 hours at 350° C. and thereafter the brazeability was assessed. Thus on each side of the core layer two Al—Si brazing material layers are applied. The thickness of each layer of the Al—Si alloy brazing clad material was each about 5% of the total thickness of the brazing sheet material.

The brazeability of the brazing sheet products have been assessed on a laboratory scale of testing in a small quartz furnace. Small coupons of 25 mm×25 mm were cut from the brazing sheet products. A small strip of an AA3003 alloy measuring 30 mm×7 mm×1 mm was bent in the centre to an angle of 45° and laid on the coupons. The strip-on-coupon samples were heated under flowing nitrogen, with heating from room temperature to 590° C., dwell time at 590° C. for 1 minute, cooling from 590° C. to room temperature. The brazed samples were assessed for the amount of fillet formed at the periphery of the AA3003 in contact with the brazing sheet products and expressed in %, for example if no fillet was formed then the amount of fillet is 0%, and when a fillet is formed around the whole periphery the amount of fillet is 100%.

It has been found that a 100% fillet formation was obtained with the brazing sheet product according to this invention.

In a further brazing test the brazing sheet material has been brazed in a industrial scale vacuum environment at about 595° C. A similar fillet formation has been found as for the CAB brazing cycle.

Thus, the brazing sheet product according to this invention can be successfully brazed in both a CAB and a VB environment. VB has been achieved at significantly lower Mg levels in the brazing sheet product resulting in a lower Mg emission and consequently increased the maintenance interval of the vacuum furnace.

Example 2

The five-layer brazing sheet material of Example 1 has been shaped and applied in an assembly of components forming an oil cooler. This oil cooler was built up from plates which have to braze both internally and also externally. Due to the long brazing cycle it was necessary to flux the outside of the oil cooler to facilitate brazing by avoiding excessive oxidation, whereas the inner surfaces of the oil cooler had not been fluxed. The oil coolers had been brazed in an industrial scale controlled atmosphere brazing furnace.

From observations it became clear that the non-fluxed inner surfaces as well as the fluxed outside surfaces showed nice round fillets which will provide amongst others a better fatigue resistance.

Example 3

Using similar manufacturing conditions as set out in Example 1 above for comparison, a 1 mm brazing sheet product has been manufactured consisting of a core layer clad on both sides with an Al—Si alloy clad layer. The core alloy layer had a composition of 0.25% Fe, 0.1% Si, 0.2% Mg, 0.5% Cu, 1.0% Mn, balance aluminium and impurities, and the clad layer had a composition of 12.7% Si and 0.3% Fe, balance aluminium and impurities.

It had been assessed for brazeability under similar CAB brazing condition as for the 5-layer brazing sheet material of Example 1, and it has been found that no fillet formation occurred.

In further experiments it has been found in the comparative brazing sheet product, that the application of a thin covering material of aluminium having only 0.3% Fe and 0.5% Si slightly improved the fillet formation to about 25%. This thin covering material is in accordance with the teaching of prior art document EP-1306207-B1.

Further experimental results showed that if no Mg is present in the brazing sheet material (neither in the core layer nor in any layer applied on top on the core layer) there is also no formation of a fillet under controlled atmosphere condition when no brazing flux is applied. Addition of a small amount of Mg in the second Al—Si alloy clad layer in combination with a first Al—Si clad layer material having no Mg addition further improves brazeability under CAB condition without a brazing flux. However, the Mg content in this second Al—Si alloy brazing clad material should not be too high if one is to obtain a good fillet formation. Further improved results are obtained when the second Al—Si alloy brazing clad layer contains in combination Bi and Mg in the claimed range together with a second Al—Si alloy brazing clad material layer. Bi is added as one of the possible wetting agents. Good results are obtained with Si levels of about 3% and of about 12% in the first Al—Si alloy clad brazing layer.

Having now fully described the invention, it will be apparent to one of ordinary skill in the art that many changes and modifications can be made without departing from the spirit or scope of the invention as herein described.

The invention claimed is:

1. A brazing sheet material comprising of an aluminium core alloy layer provided with a first brazing clad layer material on one or both sides of said aluminium core layer and at least one second brazing clad layer material positioned between the aluminium core alloy layer and the first braze clad layer material,
    wherein the second brazing clad layer material is an Al—Si alloy brazing material having 5% to 20% Si and 0.01% to 3% Mg, and
    wherein the first brazing clad layer material is an Al—Si alloy brazing material having 6% to 14% Si and less than 0.4% Mg.

2. Brazing sheet material according to claim 1, wherein the first Al—Si alloy brazing clad layer material has a Mg content of less than 0.15%.

3. Brazing sheet material according to claim 1, wherein the first Al—Si alloy brazing clad layer material is Mg-free.

4. Brazing sheet material according to claim 1, wherein the second Al—Si alloy brazing clad layer material has a Mg content in a range of 0.01% to 1%.

5. Brazing sheet material according to claim 1, wherein the sum of the Mg content in the first and second Al—Si alloy brazing clad layer material does not exceed 0.25%.

6. Brazing sheet material according to claim 1, wherein the first and the second Al—Si alloy brazing clad layers may have substantially equivalent solidus and liquidus temperatures.

7. Brazing sheet material according to claim 1, wherein the first Al—Si alloy brazing clad layer has a composition within the range of AA4045 or AA4343-series aluminium alloy.

8. Brazing sheet material according to claim 1, wherein the second Al—Si alloy brazing clad layer material further contains one or more wetting elements, and wherein the total amount of the wetting elements is in a range of 0.01% to 0.5%.

9. Brazing sheet material according to claim 1, wherein the second Al—Si alloy brazing clad layer material furthers contains Bi as wetting element in a range of 0.01% to 0.5%.

10. Brazing sheet material according to claim 9, wherein the excess Mg with respect to the stoichiometric composition of $Bi_2Mg_3$ is 0.07% or less.

11. Brazing sheet material according to claim 1, wherein the first Al—Si alloy brazing clad layer material further contains one or more wetting elements, and wherein the total amount of the wetting elements is in a range of 0.01% to 0.5%.

12. Brazing sheet material according to claim 1, wherein each of the first and second Al—Si alloy brazing clad material layers may further contain up to 0.8% Fe, and up to 0.2% Ti, and balance unavoidable impurities and aluminium.

13. Brazing sheet material according to claim 1, wherein at least one of the first and second Al—Si alloy brazing clad material layers further contain one or more elements selected from the group consisting of 0.1% to 8% of Zn, 0.01% to 1% of In, 0.01% to 1% of Sn, and 0.01% to 1% of Ge.

14. Brazing sheet material according to claim 1, wherein the first Al—Si alloy brazing clad material layer has a thickness which is 3% to 15% of the entire thickness of said aluminium alloy brazing sheet product, and the second Al—Si alloy brazing clad material layer has a thickness of 3% to 20% of the entire thickness of said aluminium alloy brazing sheet product.

15. A method of manufacturing an assembly of brazed components, comprising the steps of:
    a.) forming the components of which at least one is made from an aluminium brazing sheet material according to claim 1;
    b.) assembling the components into an assembly;
    c.) brazing the assembly without applying flux in an inert gas atmosphere at a brazing temperature for a period long enough for melting and spreading of the filler material;
    d.) cooling the brazed assembly.

16. A method of manufacturing an assembly of brazed components, comprising the steps of:
    a.) forming the components of which at least one is made from an aluminium brazing sheet material according to claim 1;
    b.) assembling the components into an assembly;
    c.) brazing the assembly without applying flux in a vacuum atmosphere at a brazing temperature for a period long enough for melting and spreading of the filler material;
    d.) cooling the brazed assembly.

17. A brazed assembly of components incorporating an aluminium alloy brazing sheet according to claim 1.

18. A brazed assembly according to claim 17, wherein the brazed assembly is an oil cooler or a B-tube.

19. Brazing sheet material according to claim 1, wherein the second Al—Si alloy brazing clad layer material has a Mg content in a range of 0.01% 0.50%.

20. Brazing sheet material according to claim 1, wherein the sum of the Mg content in the first and second Al—Si alloy brazing clad layer material does not exceed 0.10%.

21. Brazing sheet material according to claim 1, wherein the first Al—Si alloy brazing clad layer material has a Si content in the range of 6% to 12%.

22. Brazing sheet material according to claim 1, wherein the second Al—Si alloy brazing clad layer material further contains one or more wetting elements selected from the group consisting of Bi, Pb, Li, Sb, Se, Y, and Th, and wherein the total amount of the wetting elements in the second Al—Si alloy brazing clad layer material is in a range of 0.01% to 0.5%.

23. Brazing sheet material according to claim 1, wherein the second Al—Si alloy brazing clad layer material furthers contains Bi as wetting element in a range of b 0.01% to 0.25%.

24. Brazing sheet material according to claim 23, wherein the excess Mg with respect to the stoichiometric composition of $Bi_2Mg_3$ is 0.05% or less.

25. Brazing sheet material according to claim 1, wherein the first Al—Si alloy brazing clad layer material further contains one or more wetting elements selected from the group consisting of Bi, Pb, Li, Sb, Se, Y, and Th, and wherein the total amount of the wetting elements the first Al—Si alloy brazing clad layer material is in a range of 0.01% to 0.5%.

* * * * *